(12) United States Patent
DeLong et al.

(10) Patent No.: US 12,009,673 B2
(45) Date of Patent: Jun. 11, 2024

(54) INDUCTIVE POWER AND DATA TRANSFER BETWEEN MOBILE DEVICE AND VEHICLE VIA COMMON COIL

(71) Applicant: Ford Global Technologies, LLC, Dearborn, MI (US)

(72) Inventors: Aaron Matthew DeLong, Toledo, OH (US); John Robert Van Wiemeersch, Novi, MI (US); Vivekanandh Elangovan, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 537 days.

(21) Appl. No.: 17/234,384

(22) Filed: Apr. 19, 2021

(65) Prior Publication Data

US 2022/0337087 A1 Oct. 20, 2022

(51) Int. Cl.
*H02J 50/10* (2016.01)
*H02J 50/80* (2016.01)
*H04W 4/80* (2018.01)

(52) U.S. Cl.
CPC .............. *H02J 50/10* (2016.02); *H02J 50/80* (2016.02); *H04W 4/80* (2018.02)

(58) Field of Classification Search
CPC ........ H02J 50/10; H02J 50/80; H02J 7/00309; H04W 4/80; H04W 4/40; H04B 5/0031; H04B 5/0037; H04B 5/0081
USPC ......................................................... 320/108
See application file for complete search history.

(56) References Cited

U.S. PATENT DOCUMENTS

| | | | | |
|---|---|---|---|---|
| 7,812,771 B2 * | 10/2010 | Greene | ................ | H01Q 9/0407 343/702 |
| 8,427,330 B2 * | 4/2013 | Vorenkamp | ............. | H02J 50/12 455/343.1 |
| 8,461,719 B2 * | 6/2013 | Kesler | ..................... | B60L 53/51 307/104 |
| 8,527,688 B2 * | 9/2013 | Chatterjee | ......... | H04M 1/72409 336/232 |
| 8,681,000 B2 * | 3/2014 | August | ................ | A01K 11/004 340/853.2 |
| 8,751,001 B2 * | 6/2014 | Grevious | ............. | A61N 1/3706 607/32 |
| 8,791,600 B2 * | 7/2014 | Soar | ........................ | H02J 50/10 320/108 |
| 8,947,047 B2 * | 2/2015 | Partovi | ................. | H02J 7/0013 320/108 |
| 9,264,108 B2 * | 2/2016 | Von Novak, III | ....... | H02J 50/12 |
| 9,293,927 B2 * | 3/2016 | Soar | ..................... | H04B 5/0037 |
| 9,419,465 B2 | 8/2016 | van Lammeren et al. | | |
| 9,635,222 B2 * | 4/2017 | Blum | ...................... | G06F 3/013 |
| 9,680,326 B2 * | 6/2017 | Van Der Lee | .......... | H02J 50/40 |

(Continued)

FOREIGN PATENT DOCUMENTS

| CN | 103931074 A | * | 7/2014 | ............. H02J 50/10 |
|---|---|---|---|---|
| CN | 107592140 A | | 1/2018 | |
| DE | 102012214673 A1 | * | 2/2014 | ............. G08B 25/10 |

*Primary Examiner* — M Baye Diao
(74) *Attorney, Agent, or Firm* — Frank Lollo; Brooks Kushman P.C.

(57) ABSTRACT

A coil is electrically connected with an energy storage unit via circuitry. The coil wirelessly receives power from a cellular phone adjacent to the coil for transfer to the energy storage unit via the circuitry, and wirelessly receives data from the cellular phone. The coil may also wirelessly transfer power and data to the cellular phone.

15 Claims, 4 Drawing Sheets

(56) References Cited

U.S. PATENT DOCUMENTS

| | | | |
|---|---|---|---|
| 10,164,483 B2* | 12/2018 | Weale | H04B 5/0031 |
| 10,475,267 B2* | 11/2019 | DeLong | B60R 25/20 |
| 10,720,795 B2* | 7/2020 | Byrne | H02J 50/12 |
| 10,855,115 B2* | 12/2020 | Mercier | H02J 50/402 |
| 11,025,101 B2* | 6/2021 | Chung | H02J 50/402 |
| 11,211,819 B2* | 12/2021 | Ng | H01F 27/38 |
| 11,427,097 B2* | 8/2022 | Isaac | H01R 13/6205 |
| 11,509,253 B2* | 11/2022 | Spaven | B60L 50/60 |
| 2007/0098189 A1* | 5/2007 | Kukurudza | H04R 3/08 |
| | | | 381/117 |
| 2010/0131691 A1* | 5/2010 | Chatterjee | H02J 7/0044 |
| | | | 710/303 |
| 2010/0207575 A1* | 8/2010 | Pijnenburg | H02J 7/02 |
| | | | 320/108 |
| 2010/0279734 A1 | 11/2010 | Karkinen et al. | |
| 2011/0115430 A1* | 5/2011 | Saunamaki | H02J 50/12 |
| | | | 320/108 |
| 2011/0184842 A1* | 7/2011 | Melen | B60L 53/39 |
| | | | 320/108 |
| 2013/0026981 A1* | 1/2013 | Van Der Lee | H02J 50/10 |
| | | | 320/108 |
| 2014/0080411 A1* | 3/2014 | Konanur | H04B 5/0025 |
| | | | 455/41.1 |
| 2014/0242971 A1 | 8/2014 | Aladenize et al. | |
| 2014/0347057 A1* | 11/2014 | Oh | G08C 17/02 |
| | | | 324/426 |
| 2015/0171933 A1* | 6/2015 | Hamada | H04B 5/0037 |
| | | | 455/41.1 |
| 2015/0340872 A1* | 11/2015 | Franzon | H04B 5/0075 |
| | | | 307/104 |
| 2016/0190859 A1* | 6/2016 | Blum | F41C 33/029 |
| | | | 348/372 |
| 2017/0098951 A1 | 4/2017 | Olgun et al. | |
| 2017/0324253 A1* | 11/2017 | Park | H02J 7/00 |
| 2021/0162874 A1* | 6/2021 | Lee | H02J 7/0048 |

* cited by examiner

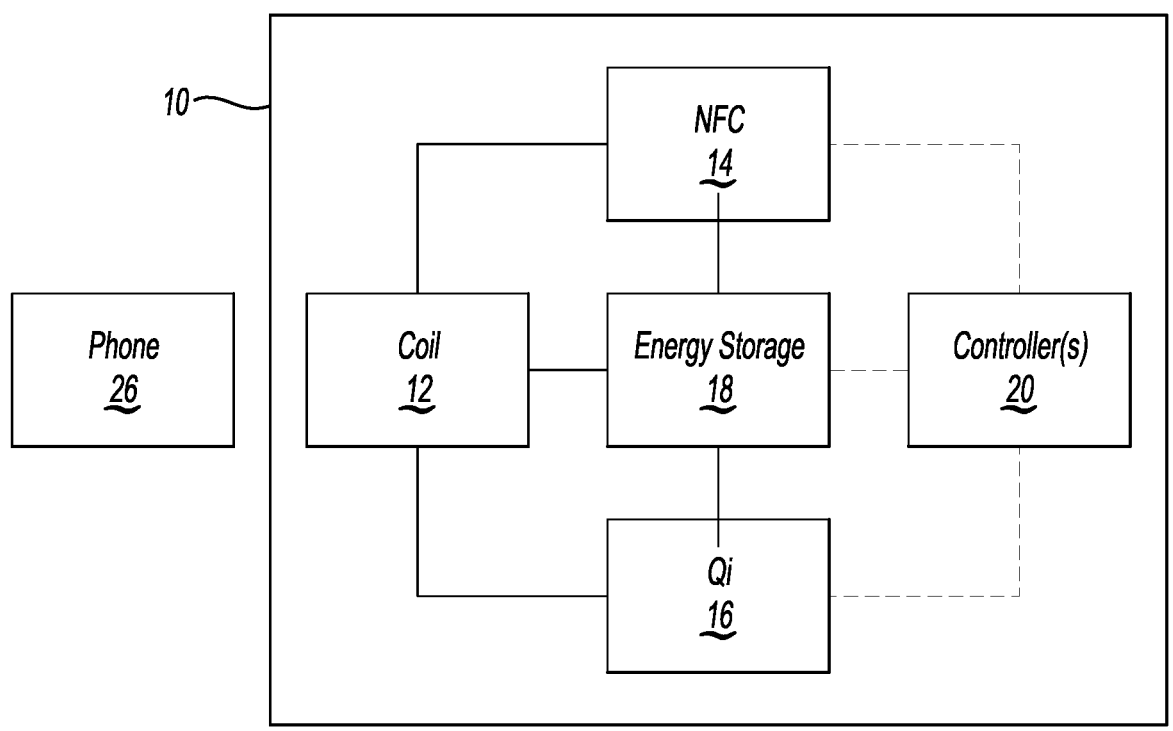
_Fig-1_
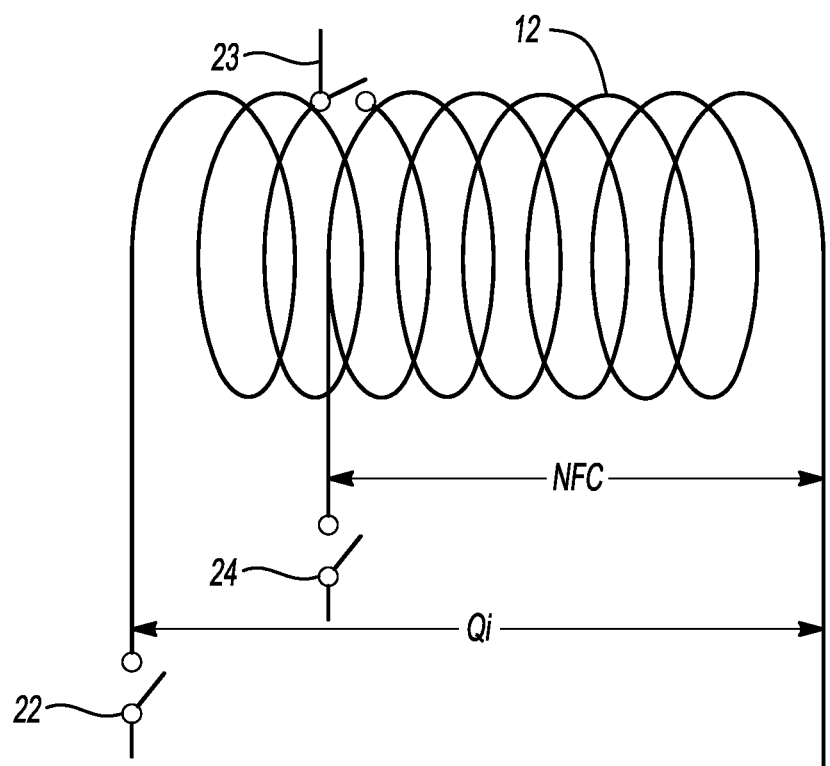
_Fig-2_

INDUCTIVE POWER AND DATA TRANSFER BETWEEN MOBILE DEVICE AND VEHICLE VIA COMMON COIL

TECHNICAL FIELD

This disclosure relates to wireless communication and power transfer between mobile devices, such as cell phones, and vehicles.

BACKGROUND

Near field communication (NFC) is a set of communication protocols for wireless communication between electronic devices at distances of less than, for example, 4 centimeters. Unlike BLUETOOTH or Wi-Fi, NFC relies on electromagnetic induction to facilitate transfer of data or power.

Qi is an open interface standard that defines wireless power transfer via electromagnetic induction between coils over distances that include 4 centimeters or less.

SUMMARY

A vehicle includes a coil arranged adjacent to an exterior body panel of the vehicle, an energy storage unit, and one or more controllers. The one or more controllers drive the coil with current from the energy storage unit at a first frequency to wirelessly transfer power from the energy storage unit to a cellular phone adjacent to the coil, and drive the coil with current from the energy storage unit at a second frequency greater than the first frequency to wirelessly transfer data to the cellular phone.

A method includes driving a coil of a vehicle with current from an energy storage unit such that the coil generates heat, driving the coil with current from the energy storage unit at a first frequency to wirelessly transfer power from the energy storage unit to a cellular phone adjacent to the coil, and driving the coil with current from the energy storage unit at a second frequency greater than the first frequency to wirelessly transfer data to the cellular phone.

A communication and power system for a vehicle includes an energy storage unit, circuitry, and a coil electrically connected with the energy storage unit via the circuitry. The coil wirelessly receives power from a cellular phone adjacent to the coil for transfer to the energy storage unit via the circuitry, and wirelessly receive power from the cellular phone containing data from the cellular phone.

BRIEF DESCRIPTION OF THE DRAWINGS

FIG. 1 is a schematic diagram of a vehicle.

FIG. 2 is a schematic diagram of the coil of FIG. 1.

DETAILED DESCRIPTION

Figure 3:
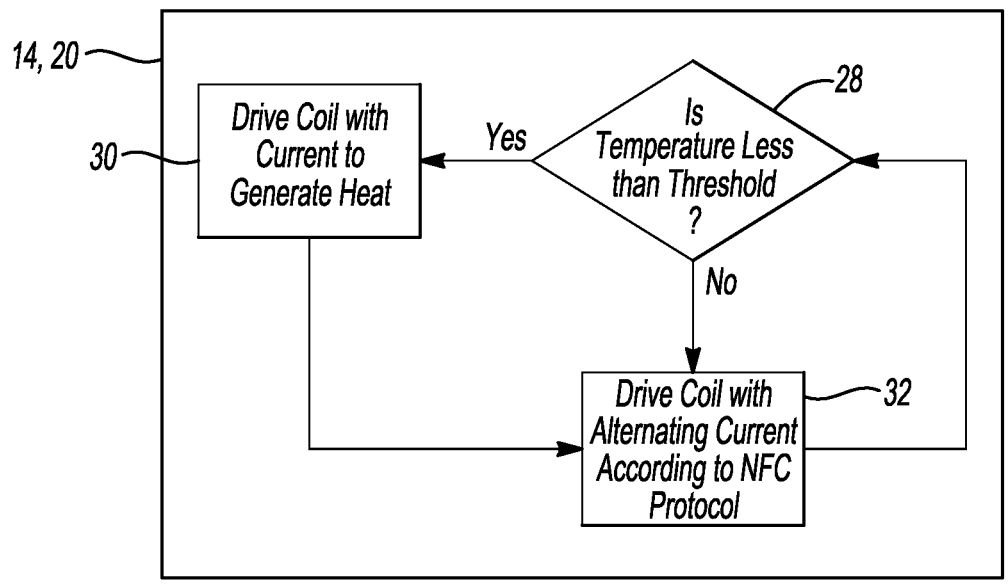
FIG. 3 is a flow chart of an algorithm for generating heat and transferring data via the coil of FIG. 1.

Embodiments are described herein. It is to be understood, however, that the disclosed embodiments are merely examples and other embodiments may take various and alternative forms. The figures are not necessarily to scale. Some features could be exaggerated or minimized to show details of particular components. Therefore, specific structural and functional details disclosed herein are not to be interpreted as limiting, but merely as a representative basis for teaching one skilled in the art.

Near field communication (NFC) can be used to induce electric currents within passive components. This means that passive devices may not require their own power supply. Instead, they can be powered by the electromagnetic field produced by an active NFC component when it comes into range. Moreover, recent updates to the NFC specification allows for an NFC transmitter to deliver power to an NFC device at rates of up to 1 Watt. Power transfer according to the Qi standard can also be used to induce electric currents within passive components. As such, this disclosure relates to phone-based key features, vehicles, and NFC/Qi-related activities.

Certain vehicle manufacturers have a phone-based key feature called phone-as-a-key, which uses, for example, Bluetooth Low Energy technology for communication and device localization, or ultra-wideband. Some next generation phone-as-a-key systems may include NFC technology as a backup means of communication, in accordance with the Car Connectivity Consortium's (CCC's) Digital Key standard. Phones compliant to this CCC standard may be able to communicate via an NFC interface for a period of time even when their battery state of charge is too low to allow the phone to power up. This is because the NFC function in the phone can operate on reserve battery power.

The CCC standard for the phone to provide NFC communication off residual phone battery power will allow NFC dialog to occur when the phone will not power-up and function as a phone. The CCC standard, however, does not define how long it must store this power, how many NFC dialogs can occur, if a single event can occur outside the normal operating temperature of the phone (typically 0 C to 40 C), or how the charge degrades near the temperature end points for normal phone operation.

Although it is known to offer Qi chargers on a vehicle exterior for charging a phone, Qi is not yet in all phones that have NFC or all phones with CCC compliant NFC.

When a user's phone battery state of charge is too low for the phone to operate and the phone does not have any reserve power left, the user may not be able to unlock or start the vehicle with their phone. Even though phones compliant to CCC Digital Key will support reserve power NFC operation, this functionality may not last indefinitely. A phone's battery may be depleted for an extended period of time or environmental conditions may cause a phone's reserve power to decrease rapidly.

When a user's vehicle battery state of charge is too low for the access system to work, the user may not be able to access the vehicle with their phone. Even if the phone has power, it may still not be able to access the vehicle if the vehicle battery state of charge is too low. Currently, some vehicles come with a mechanical blade key that can be used to unlock the vehicle. Once inside, a user can release the hood and then charge the battery. Carrying a mechanical key, however, may not be desirable for digital key users.

Other solutions, primarily for electric vehicles, allow a user to release the hood via applying power to terminals or wires accessible via an exterior port. Once opened, the user can charge the battery. These solutions, however, also have challenges: They are not immediately intuitive and are not desirable on gas vehicles. Concepts herein may help mitigate some of the issues mentioned above.

An exterior NFC reader can be implemented to deliver power via NFC. (While CCC compliant phones may have NFC power transceiver capability, CCC compliant phones may not be Qi capable). This may allow a user to charge their phone at the vehicle's exterior NFC reader via NFC, assuming the phone can accept power via NFC. Indication that a charging session has started may be made through audio or visual alerts or signals. Charging time may be limited for known devices, such as devices set up as a phone-as-a-key device, etc. Charging time may be further limited or prevented for unknown devices. At the charging limit, a message may be transmitted to the unknown device stating that charging may continue for a small fee, which the user can pay.

An exterior NFC reader can be implemented that also serves as a Qi wireless charger to deliver power via Qi. That is, a same coil is used for NFC and Qi—not two separate coils. Such a reader may normally operate at the frequency defined by NFC and may intermittently switch to the frequency defined by Qi to check for Qi-enabled devices. This may allow a user to charge their Qi-enabled phone at the vehicle's exterior NFC reader via Qi. Indication that a charging session has started may be made through audio or visual alerts or signals. Similar to the above, charging time may be limited for known devices, such as devices set up as a phone-as-a-key device, etc. Charging time may be further limited or prevented for unknown devices. At the charging limit, a message may be transmitted to the unknown device stating that charging may continue for a small fee, which the user can pay.

An exterior NFC reader can be implemented to accept power via NFC. This may allow a user to charge an energy storage source inside the vehicle with their NFC-enabled phone via NFC, assuming the phone can deliver power via NFC. Indication that a charging session has started may be made through audio or visual alerts or signals. When the storage source's state of charge is sufficient, a user may unlock a door (e.g., the driver door) using their NFC-enabled phone. This scenario assumes (i) the user's device is set up as a key and that the energy source can power the main module, which can authenticate the device and issue the unlock command and (ii) the storage source is not the vehicle battery but rather a temporary power storage device capable of delivering enough power to release the driver door latch. Once inside, the user can pull the hood release and charge the auxiliary battery.

An exterior NFC reader can be implemented that also serves as a Qi wireless charging device and can accept power via Qi. That is as above, a same coil is used for NFC and Qi activities. This reader may accept Qi charging when the vehicle battery is low or there is no NFC device transaction occurring. It may also allow the user to charge an energy storage source inside the vehicle with their NFC-enabled phone via Qi. Indication that a charging session has started may be made through audio or visual alerts or signals. When the storage source's state of charge is sufficient, a user may unlock the driver door using their NFC-enabled phone. This scenario assumes the user's device is set up as a key and that the energy source can power the main module, which can authenticate the device and issue the unlock command. Once inside, the user can pull the hood release and charge the auxiliary battery.

To manage scenarios in which the phone is too cold for the NFC transceiver to function off the residual phone battery charge, the vehicle NFC/Qi interface could first use the coil to generate heat (e.g., drive the coil with AC or DC power to warm the coil and thus the phone). It may intermittently DC drive the coil and then NFC/Qi drive the coil to check if the phone starts to communicate via NFC and then return to DC and then back to NFC dialog for some pre-determined period (e.g., 3 minutes). The vehicle may do this, for example, if ambient temperature detected by an appropriate sensor (e.g., temperature sensor) is less than 35° F. for example, and it detects an inductive change at the coil but not a functioning phone.

Some or all of these solutions may be combined into one system that delivers and accepts charge via NFC and Qi. In addition, a magnetic attachment system may be included to hold a user's phone in place while it is charging so the user does not have to hold it up.

The benefits of a system that uses the same coil for NFC and Qi is that communication and wireless charging can be offered in one system without increasing the packaging size of the exterior NFC reader. There is already limited space in door handles and beneath B-pillar applique for packaging electronics.

Referring to FIG. 1, a vehicle 10 includes a coil 12, NFC circuitry 14 (circuitry that adheres to the NFC standard), Qi circuitry 16 (circuitry that adheres to the Qi standard), an energy storage unit 18 (e.g., battery, ultra-capacitor, etc.), and one or more controllers 20. The vehicle 10 is shown as a box, the lines of which represent exterior body panels thereof. Given the NFC circuitry 14 and Qi circuitry 16 have known arrangements and function defined by their respective standards, they need not be discussed in greater detail herein. The NFC circuitry 14, Qi circuitry 16, and energy storage unit 18 and in communication with and/or under the control of the one or more controllers 20. Moreover, the coil 12, NFC circuitry 14, and Qi circuitry 16 are arranged to receive energy from the energy storage unit 18, and the energy storage unit 18 may receive energy from the NFC circuitry 14 and/or Qi circuitry 16 as discussed below.

Referring to FIGS. 1 and 2, the NFC circuitry 14 and Qi circuitry 16 are each electrically connected across the coil 12. For operation according to the Qi protocol, it may be desirable for the coil 12 to effectively have more turns than operation according to the NFC protocol. As such in this example, the interconnections between the coil 12 and NFC circuitry 14 and Qi circuitry 16 include switches 22, 23, 24, which are under the control of the one or more controllers 20. The one or more controllers 20 may thus command the switches 22, 23 to open and command the switch 24 to close prior to driving the NFC circuitry 14 (and coil 12) with power from the energy storage unit 18 according to the NFC protocol (among other things, at a frequency of approximately 13.56 MHz) to facilitate communication and/or power transfer via the coil 12. The one or more controllers 20 may also command the switches 22, 23 to close and command the switch 24 to open prior to driving the Qi circuitry 16 (and coil 12) with power from the energy storage unit 18 according to the Qi protocol (among other things, at a frequency in the range of 80 to 300 kHz) to facilitate power transfer via the coil 12.

The above referenced communication and power transfer may take place with a cellular phone 26 (or other mobile device such as a tablet, etc.) placed near the coil 12 that is NFC and/or Qi capable. As suggested earlier however, the cellular phone 26 may also communicate with the one or more controllers 20 and/or transfer power to the energy storage unit 18. That is, the coil 12 may wirelessly receive power from the cellular phone 26 according to the Qi standard, with such power being transferred to the energy storage unit 18 via the Qi circuitry 16. And, the coil 12 may wirelessly receive power from the cellular phone 26 according to the NFC protocol containing data from the cellular phone 26 for interpretation by the one or more controllers 20 via the NFC circuitry 14.

The following flow charts represent various algorithms contemplated herein. Some of the operations may be omitted, combined, or performed in different order or at different times. In these examples, the operations are shown as being performed by the NFC circuitry 14, Qi circuitry 16, and/or one or more controllers 20. As explained below however, this need not necessarily be the case.

Referring to FIG. 3, it is determined whether temperature is less than a threshold at operation 28. If yes, the coil 12 may be driven with alternating or direct current sourced from the energy storage unit 18 at operation 30 such that the coil 12 generates heat. At operation 32, the coil 12 may then be driven with alternating current sourced from the energy storage unit 18 according to the NFC protocol to wirelessly transfer data via the coil 12. The algorithm may then return to operation 28.

Returning to operation 28, if no, the algorithm may proceed to operation 32.

Figure 4:
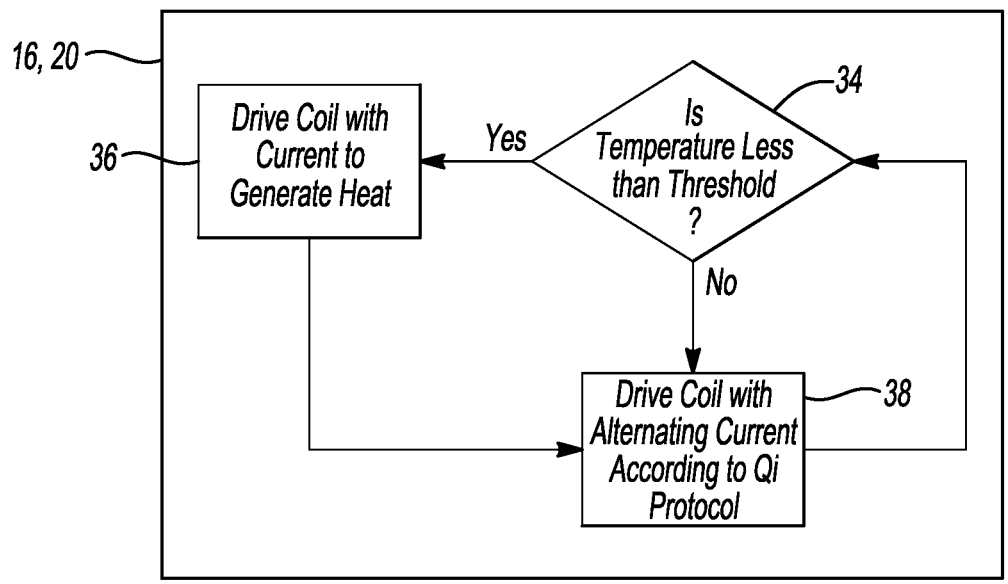
FIG. 4 is a flow chart of an algorithm for generating heat and transferring power via the coil of FIG. 1.

Referring to FIG. 4, it is determined whether temperature is less than a threshold at operation 34. If yes, the coil 12 may be driven with current sourced from the energy storage unit 18 at operation 36 such that the coil 12 generates heat. At operation 38, the coil 12 may then be driven with alternating current sourced from the energy storage unit 18 according to the Qi protocol to wirelessly transfer power via the coil 12. The algorithm may then return to operation 34.

Returning to operation 34, if no, the algorithm may proceed to operation 38.

Figure 5:
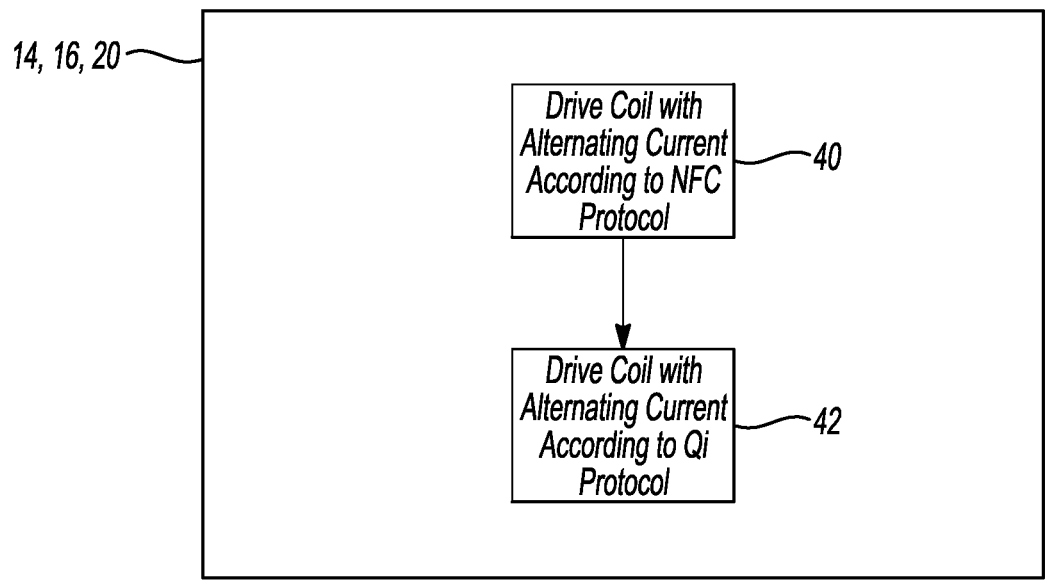
FIG. 5 is a flow chart of an algorithm for transferring data and power via the coil of FIG. 1.

Referring to FIG. 5, the coil 12, at operation 40, may be driven with alternating current sourced from the energy storage unit 18 according to the NFC protocol to wirelessly transfer data via the coil 12 at operation 40. The coil 12, at operation 42, may be driven with alternating current sourced from the energy storage unit 18 according to the Qi protocol to wirelessly transfer power via the coil 12.

Figure 6:
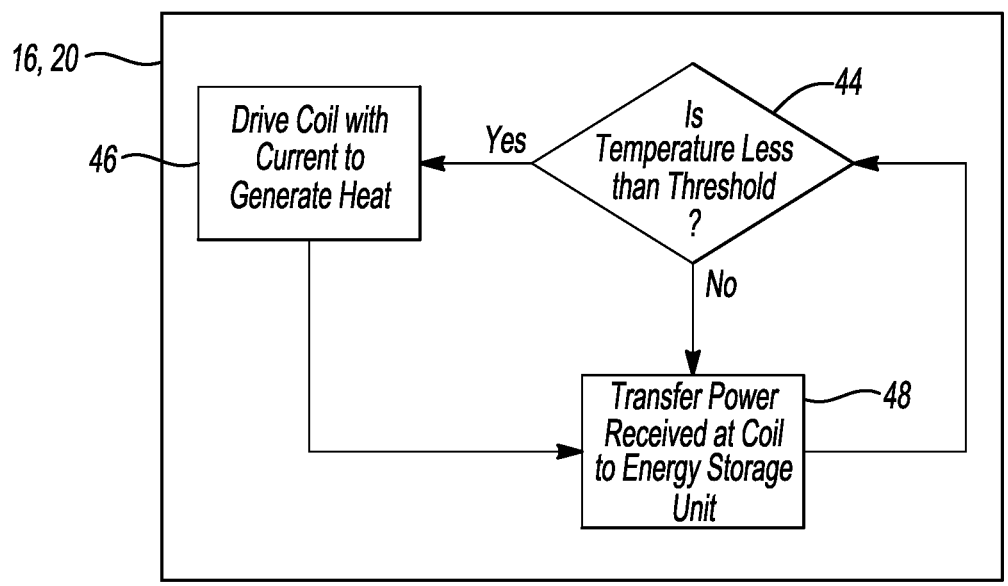
FIG. 6 is a flow chart of an algorithm for generating heat and receiving power via the coil of FIG. 1.

Referring to FIG. 6, it is determined whether temperature is less than a threshold at operation 44. If yes, the coil 12 may be driven with current sourced from the energy storage unit 18 at operation 46 such that the coil 12 generates heat. At operation 48, power received at the coil 12 may then be transferred to the energy storage unit 18. The algorithm may then return to operation 44.

Returning to operation 44, if no, the algorithm may proceed to operation 48.

Figure 7:
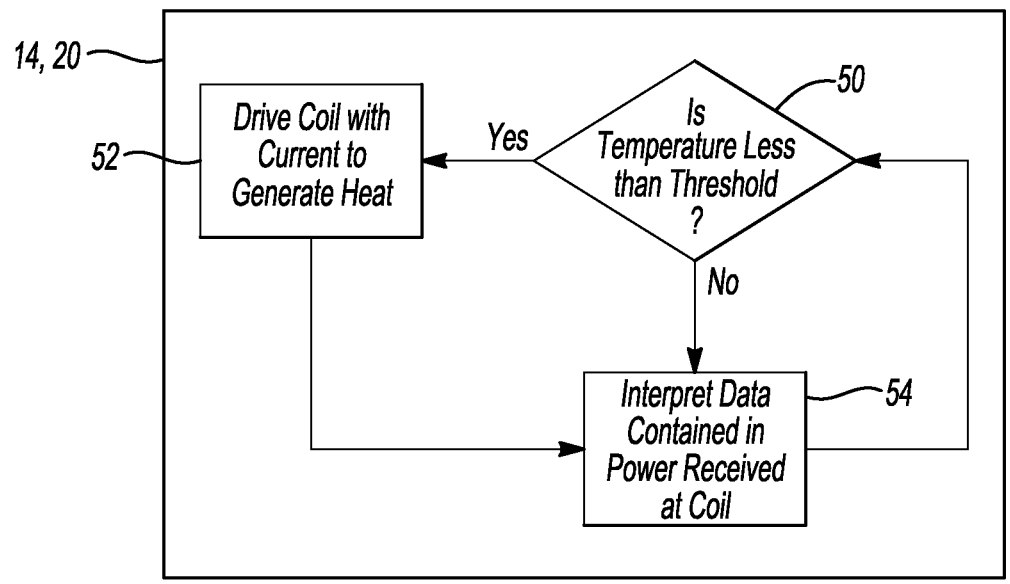
FIG. 7 is a flow chart of an algorithm for generating heat and receiving data via the coil of FIG. 1.

Referring to FIG. 7, it is determined whether temperature is less than a threshold at operation 50. If yes, the coil 12 may be driven with current sourced from the energy storage unit 18 at operation 52 such that the coil 12 generates heat. At operation 54, data contained in power received via the coil 12 may then interpreted. The algorithm may then return to operation 50.

Returning to operation 50, if no, the algorithm may proceed to operation 54.

Figure 8:
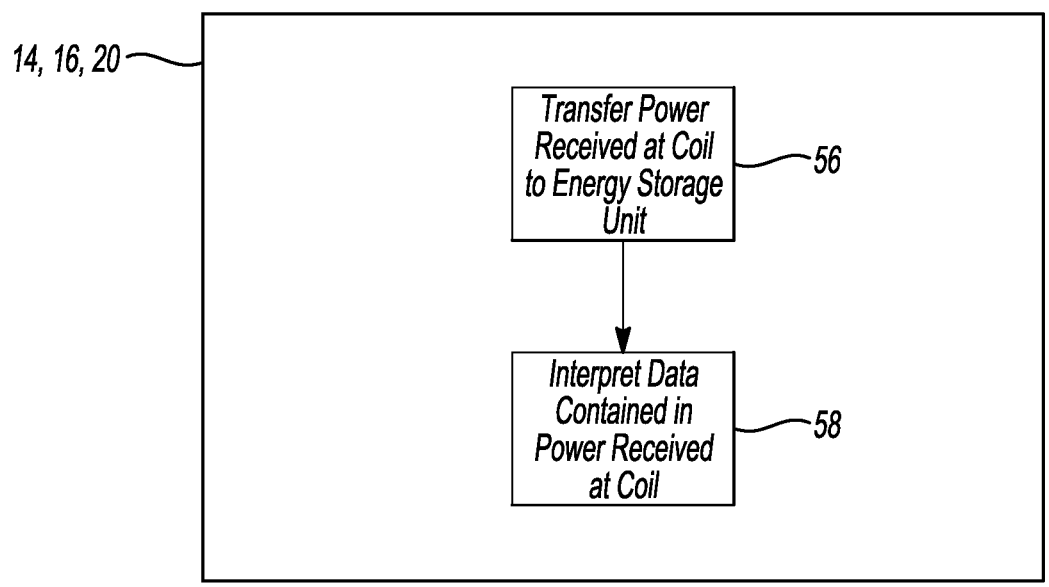
FIG. 8 is a flow chart of an algorithm for receiving power and data via the coil of FIG. 1.

Referring to FIG. 8, at operation 56, power received at the coil 12 may then be transferred to the energy storage unit 18. At operation 58, data contained in power received via the coil 12 may be interpreted.

As suggested above, the algorithms, methods, or processes disclosed herein can be deliverable to or implemented by a computer, controller, or processing device, which can include any dedicated electronic control unit or programmable electronic control unit. Similarly, the algorithms, methods, or processes can be stored as data and instructions executable by a computer or controller in many forms including, but not limited to, information permanently stored on non-writable storage media such as read only memory devices and information alterably stored on writeable storage media such as compact discs, random access memory devices, or other magnetic and optical media. The algorithms, methods, or processes can also be implemented in software executable objects. Alternatively, the algorithms, methods, or processes can be embodied in whole or in part using suitable hardware components, such as application specific integrated circuits, field-programmable gate arrays, state machines, or other hardware components or devices, or a combination of firmware, hardware, and software components.

While exemplary embodiments are described above, it is not intended that these embodiments describe all possible forms encompassed by the claims. The words used in the specification are words of description rather than limitation, and it is understood that various changes may be made without departing from the spirit and scope of the disclosure. The phrase "cellular phone," for example, means "mobile device" more generally.

As previously described, the features of various embodiments may be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. A vehicle comprising:
    a coil arranged adjacent to an exterior body panel of the vehicle;
    an energy storage unit; and
    one or more controllers programmed to
        selectively actuate switches connected with the coil to effectively increase a number of turns of the coil, and then drive the coil with current from the energy storage unit at a first frequency to wirelessly transfer power from the energy storage unit to a cellular phone adjacent to the coil, and
        drive the coil with current from the energy storage unit at a second frequency greater than the first frequency to wirelessly transfer data to the cellular phone.

2. The vehicle of claim 1, wherein the one or more controllers are further programmed to selectively actuate the switches to effectively decrease the number of turns of the coil prior to driving the coil with the current at the second frequency.

3. The vehicle of claim 1, wherein the one or more controllers are further programmed to drive the coil with current from the energy storage unit such that the coil generates heat.

4. The vehicle of claim 1, wherein the coil is configured to wirelessly receive power from the cellular phone for the energy storage unit.

5. The vehicle of claim 1, wherein the coil is further configured to wirelessly receive data from the cellular phone.

6. A method comprising:
   driving a coil of a vehicle with direct current from an energy storage unit such that the coil generates heat;
   driving the coil with current from the energy storage unit at a first frequency to wirelessly transfer power from the energy storage unit to a cellular phone adjacent to the coil;
   driving the coil with current from the energy storage unit at a second frequency greater than the first frequency to wirelessly transfer data to the cellular phone; and
   wirelessly receiving data via the coil from the cellular phone.

7. The method of claim 6 further comprising actuating switches connected with the coil to effectively change a number of turns of the coil.

8. The method of claim 7 further comprising actuating the switches to effectively increase the number of turns of the coil prior to driving the coil with the current at the first frequency.

9. The method of claim 7 further comprising actuating the switches to effectively decrease the number of turns of the coil prior to driving the coil with the current at the second frequency.

10. The method of claim 6, wherein driving the coil with direct current is responsive to ambient temperature being less than a predetermined value.

11. The method of claim 6 further comprising wirelessly receiving power via the coil from the cellular phone for the energy storage unit.

12. A communication and power system for a vehicle, comprising:
   an energy storage unit;
   circuitry;
   a coil electrically connected with the energy storage unit via the circuitry, and configured to wirelessly receive power from a cellular phone adjacent to the coil for transfer to the energy storage unit via the circuitry, and to wirelessly receive data from the cellular phone; and
   one or more controllers programmed to, responsive to ambient temperature being less than a threshold, drive the coil with current from the energy storage unit such that the coil generates heat.

13. The communication and power system of claim 12 further comprising one or more controllers programmed to drive the coil with alternating current from the energy storage unit to wirelessly transfer power from the energy storage unit to the cellular phone.

14. The communication and power system of claim 12 further comprising one or more controllers programmed to drive the coil with alternating current from the energy storage unit to wirelessly transfer data to the cellular phone.

15. The communication and power system of claim 12 further comprising switches connected to the coil and configured to effectively change a number of turns of the coil.

* * * * *